United States Patent [19]

Koch et al.

[11] 4,105,430

[45] Aug. 8, 1978

[54] FERTILIZER COMPOSITIONS CARRYING AN AMINOALKANOL AS ANTICAKE AGENT

[75] Inventors: Karlheinz Koch, Haan; Wolfgang Rupilius, Dusseldorf, both of Fed. Rep. of Germany

[73] Assignees: Henkel Kommanditgesellschaft auf Aktien, Dusseldorf; Deutsche Gold- und Silber-Scheideanstalt vormals Roessler, Frankfurt am Main, both of Fed. Rep. of Germany

[21] Appl. No.: 683,321

[22] Filed: May 5, 1976

[30] Foreign Application Priority Data

Jun. 7, 1975 [DE] Fed. Rep. of Germany ....... 2525568

[51] Int. Cl.² .............................................. C05C 1/00
[52] U.S. Cl. ...................................... 71/59; 71/64 E; 252/392
[58] Field of Search ................. 252/392; 71/1, 27, 58, 71/59, 64 R, 64 E, 64 F

[56] References Cited

U.S. PATENT DOCUMENTS

| | | | |
|---|---|---|---|
| 3,264,088 | 8/1966 | Hansen | 71/64 F |
| 3,726,912 | 4/1973 | McCrary et al. | 71/27 X |
| 3,872,116 | 3/1975 | Gipson | 252/392 |

*Primary Examiner*—Frank A. Spear, Jr.
*Assistant Examiner*—Ferris H. Lander
*Attorney, Agent, or Firm*—Hammond & Littell

[57] ABSTRACT

The tendency of particles of water-soluble hygroscopic salts and fertilizers containing water-soluble hygroscopic salts to cake when allowed to stand is decreased when the particles have a uniformly distributed surface content of an aminoalkanol material selected from the group consisting of (1) a mixture of vicinal aminoalkanols of the formula:

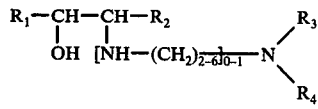

wherein $R_1$ and $R_2$ each represent H or $-(CH_2)_{1-18}H$; $R_1$ and $R_2$ together contain 9–18 carbon atoms; and $R_3$ and $R_4$ each represent H, $C_{1-4}$ alkyl and $C_{2-4}$ hydroxyalkyl; and (2) salts thereof with water-soluble acids.

The aminoalkanols can be applied from organic solvent or water solution, or as a hot melt.

16 Claims, No Drawings

FERTILIZER COMPOSITIONS CARRYING AN AMINOALKANOL AS ANTICAKE AGENT

FIELD OF INVENTION

The present invention relates to solid hygroscopic salts (and mixtures of hygroscopic salts including synthetic fertilizers) in particulate, free-flowing state of reduced tendency to cake on storage. The invention includes the modified particles themselves and methods for treating the particles to decrease their tendency to cake.

BACKGROUND OF INVENTION

As known, many inorganic salts and oxides, among them components of mixed fertilizers like potassium chloride and the nitrogenous salts (ammonium nitrate, ammonium sulfate, sodium nitrate and diammonium phosphate) are hygroscopic and therefore cake or coalesce when stored, particularly at elevated humidity, temperature and pressure. Materials of this type are not suitable for storage in bulk since after such storage they cannot be spread readily by mechanical spreaders.

In order to reduce caking, hygroscopic materials of this type (including fertilizers) are produced in the form of pellets or "prills" of equal size which are coated with talcum, kieselguhr, diatomaceous earth or chalk in order to prevent absorption of moisture. But in these methods large amounts of one or more of these anti-caking agents must be added, so that when the material is a fertilizer its nutrient content is reduced and in any event considerable dust is developed when the coated particles are spread.

U.S. Pat. No. 2,480,694 discloses that fatty amines and their derivatives prevent the caking of fertilizers. Solutions of fatty amines in mineral oil and the spraying of these solutions on fertilizers are described in U.S. Pat. No. 3,186,828. In general, fatty amines (including fatty diamines) which contain a fatty radical of 8 to 22 carbon atoms, as well as their salts (particularly the acetates and chlorides) and their ethoxylates, are used. But these methods and products have the disadvantage that the anticaking effect achieved with fatty amines and their derivatives is not satisfactory. It is difficult to apply the solid fatty amines evenly to the salt or fertilizer material; and the products are not harmless because of their strong amine odor and their tendency to irritate the eyes and skin.

OBJECTS OF THE INVENTION

It is an object of the present invention to provide a hygroscopic salt material (including synthetic fertilizers) in free-flowing, particulate form with a surface content of a material which will inhibit the tendency of said particles to cake on storage.

It is a further object of the invention to provide such a composition wherein the anti-caking component is effective when present in very minor amount.

It is a further object of the invention to provide such a composition wherein the anti-caking composition has no perceptible effect upon the ecology, is substantially odorless, and is comparatively harmless from the dermatological point of view.

Finally, it is an object of the invention to produce non-caking, water-soluble particles of said salt material without need for organic solvents and preferably without need for water as solvent.

THE INVENTION

It has now been found that the tendency of salts and chemical fertilizers to cake on standing is decreased to a surprisingly great extent when the anti-caking agent is
(1) a mixture of vicinal aminoalkanols of the formula:

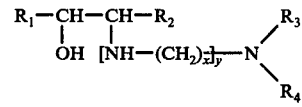

wherein $R_1$ and $R_2$ each denote hydrogen and/or unbranched alkyl radicals with 1 to 18 carbon atoms, where the sum of the carbon atoms in $R_1$ and $R_2$ is 9 to 18, where the radicals $R_3$ and $R_4$ can be the same or different and denote hydrogen, alkyl radicals with 1 to 4 carbon atoms or hydroxyalkyl radicals with 2 to 4 carbon atoms, where $x$ represents a value of 2 to 6 and $y$ represents a value of 0 to 1, the

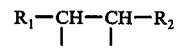

units in the aminoalkanols of said mixture being of at least two different chain lengths in the range from 11 to 20 carbon atoms; and (2) salts of the aminoalkanols in said mixture.

As starting materials for the production of the mixtures of aminoalkanols according to the invention, a variety of olefin mixtures can be used.

Suitable mixtures of monoolefins are obtained by dehydrogenation (catalytically or by chlorination followed by dehydrochlorination) of linear paraffins of 8 to 24 carbon atoms followed by removal of the monoolefin content of the reaction product (by distillation or selective extraction as may be preferred). In these monoolefins the double bonds are substantially non-terminal and are distributed statistically (i.e., randomly) along the "backbone"

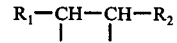

chain.

With regard to chain length, preferred monoolefins conform to the chain length distribution shown in the examples below.

On the other hand, it is also possible to use olefin mixtures which are prepared by aluminochemical methods and which have unbranched alkyl chains with 12 to 20 carbon atoms. These mixtures have a high proportion of terminal unsaturation, and commercial products are suitable which have length distributions shown in the examples.

The position of the vicinal

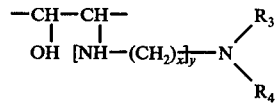

units on the

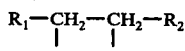

chain is therefore not critical. It is preferred, however, that units be terminally located, one of $R_1$ or $R_2$ is hydrogen.

The monoolefin mixtures are converted by known methods, for example, by reaction with per acids like peracetic acid, to the corresponding epoxide mixtures, from which aminoalkanol mixtures suitable for use according to the invention are obtained by reaction with amines like ammonia, methylamine, ethylamine, butylamine, dimethylamine, diethylamine, methylethylamine, ethylenediamine, propylenediamine, monoethanolamine, diethanolamine and N-ethanol-ethylene-diamine.

The salts of the aminoalkanol mixtures with inorganic acids and aliphatic carboxylic acids with 2 to 20 carbon atoms, particularly with water-soluble acids like hydrogen chloride and acetic acid, can be prepared according to conventional methods.

Salts and salt-containing fertilizer compositions exhibit resistance to caking on storage when having a surface content of the aforementioned aminoalkanols, and in preferred embodiments they are far superior to such compositions carrying a fatty amine or fatty amine derivative of a fatty acid or alcohol.

Preferred anti-caking agents are aminoalkanol mixtures which are derived from monoolefin mixtures with substantially terminally located double bonds and chain lengths of 12 to 20 carbon atoms.

Preferably therefore, in the formula given above, the

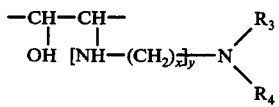

group occupies a terminal position on the

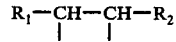

chain.

Due to their relatively low flow points, most of the aminoalkanols described herein can be easily applied by spray while the particulate component is tumbled in a suitable mixing apparatus, for example, in a rotary drum mixer or screw conveyer mixture, directly on the salt or fertilizer composition and can thus be distributed evenly on the particles. Thus there is no need to apply them as a solution (for example, in mineral oil). The products with higher solidifying points can be applied either as a solution in an organic solvent, e.g. mineral oil, or they can be applied directly to the material as a solvent-free melt at a temperature above their flow point (e.g., 60° to 80° C.). When applied in this manner the aminoalkanols are contained only on the surface of the particles. The aminoalkanol mixtures can be applied as free bases or as salts with water-soluble acids or with water-insoluble acids, at least up to the $C_{20}$ acids. They can also be applied as solutions in solvents or water.

The amount of anti-caking agent according to the invention that is necessary to significantly decrease the caking properties of salts and fertilizers is very small. It ranges from 0.05 to 0.2% of the weight of the salt component to which it is applied.

A suitable amount of the anti-caking agent can be determined in any instance by making a series of trials with increasing amounts of agent within the range mentioned.

When the aminoalkanol is applied as a solution or dispersion, the content of the agent, particularly if the products are used as salts, is preferably between 25% and 100% of the weight of the dispersion medium or solvent used.

Another advantage of the invention is that the aminoalkanol mixtures are considerably safer to handle since they have only weak amine odor and are less dangerous to eyes and skin than corresponding fatty amines.

The use of the products according to the invention as anti-caking agents is described more fully below on the basis of examples. These examples are merely illustrative, and are not to be construed in limitation of the invention.

EXAMPLES

The aminoalkanol mixtures, which are prepared by reacting the olefin-epoxide mixtures and amines and which were tested for use an anti-caking agents, are listed in Table 1 below. The following tabulation identifies the epoxide mixtures, the chain lengths, position of the olefinic double bonds and composition in terms of chain length distribution of the olefins from which the aminoalkanols disclosed below were prepared. All percentages are approximate percentages by weight.

| Olefin Fractions Used | | |
|---|---|---|
| Fraction | | Approx. % by Wt. |
| (a) $C_{11}$-$C_{14}$ Fraction | | |
| $C_{11}$, | Non-terminal | 22 |
| $C_{12}$, | " | 30 |
| $C_{13}$, | " | 26 |
| $C_{14}$, | " | 22 |
| (b) $C_{15}$-$C_{18}$ Fraction | | |
| $C_{15}$, | Non-terminal | 26 |
| $C_{16}$, | " | 35 |
| $C_{17}$, | " | 31 |
| $C_{18}$, | " | 6 |
| (c) $C_{12}$/$C_{14}$ Fraction | | |
| $C_{12}$, | Terminal | 55 |
| $C_{14}$, | " | 31 |
| $C_{12}$, | Non-terminal | 5 |
| $C_{14}$, | " | 8 |
| (d) $C_{14}$/$C_{16}$ Fraction | | |
| $C_{14}$, | Terminal | 53 |
| $C_{16}$, | " | 28 |
| $C_{14}$, | Non-terminal | 7 |
| $C_{16}$, | " | 11 |
| (e) $C_{16}$/$C_{18}$ Fraction | | |
| $C_{16}$, | Terminal | 35 |
| $C_{18}$, | " | 23 |
| $C_{20}$, | " | 2 |
| $C_{16}$, | Non-terminal | 11 |
| $C_{18}$, | " | 21 |
| $C_{20}$, | " | 5 |

TABLE 1

Aminoalkanol Used

| Desig.[1] | Solid Pt. °C.[2] | Starting Epox. Olefin[3] | Starting Amine | Substituent |
|---|---|---|---|---|
| N-T58 M | −3 | $C_{15}-C_{18}$ | Methylamine | —NHCH$_3$ |
| T24 M | 49 | $C_{12}/C_{14}$ | " | " |
| T24 E | 53 | $C_{12}/C_{14}$ | Ethylamine | —NH(CH$_2$CH$_3$) |
| N-T14 DM | −66 | $C_{11}-C_{14}$ | Dimethylamine | —N(CH$_2$)$_3$ |
| N-T58 DM | −34 | $C_{15}-C_{18}$ | Dimethylamine | " |
| T24 DM | −25 | $C_{12}/C_{14}$ | Dimethylamine | " |
| T46 DM | −1 | $C_{14}/C_{16}$ | Dimethylamine | " |
| N-T14 A | −5 | $C_{11}-C_{14}$ | Ammonia | —NH$_2$ |
| N-T58 A | 16 | $C_{15}-C_{18}$ | " | " |
| N-T14 AE | 14 | $C_{11}-C_{14}$ | Ethylenediamine | —NHCH$_2$CH$_2$NH$_2$ |
| N-T58 AE | 18 | $C_{15}-C_{18}$ | Ethylenediamine | " |
| T24 AE | 47 | $C_{12}/C_{14}$ | Ethylenediamine | " |
| T46 AE | 65 | $C_{14}/C_{16}$ | Ethylenediamine | " |
| T68 AE | 66 | $C_{16}/C_{18}$ | Ethylenediamine | " |
| N-T14 AP | −37 | $C_{11}-C_{14}$ | Propylenediamine | —NH(CH$_2$)$_3$NH$_2$ |
| N-T58 AP | −28 | $C_{15}-C_{18}$ | Propylenediamine | " |
| T24 AP | 50 | $C_{12}/C_{14}$ | Propylenediamine | " |
| T46 AP | 72 | $C_{14}/C_{16}$ | Propylenediamine | " |
| T68 AP | 71 | $C_{16}/C_{18}$ | Propylenediamine | " |
| N-T14 HE | −23 | $C_{11}-C_{14}$ | Monoethanolamine | —NH(CH$_2$CH$_2$OH) |
| N-T58 HE | −17 | $C_{15}-C_{18}$ | Monoethanolamine | " |
| N-T14 DHE | −17 | $C_{11}-C_{14}$ | Diethanolamine | —N(CH$_2$CH$_2$OH)$_2$ |
| N-T58 DHE | −21 | $C_{15}-C_{18}$ | Diethanolamine | " |
| T24 DHE | −10 | $C_{12}/C_{14}$ | Diethanolamine | " |
| T46 DHE | 24 | $C_{14}/C_{16}$ | Diethanolamine | " |
| T68 DHE | 27 | $C_{16}/C_{18}$ | Diethanolamine | " |
| N-T14 HE-AE | −2 | $C_{11}-C_{14}$ | N-ethanolethylenediamine | —NHCH$_2$CH$_2$NH(CH$_2$CH$_2$OH) |
| N-T58 HE-AE | 2 | $C_{15}-C_{18}$ | N-ethanolethylenediamine | " |

[1](T = terminal) (N-T = non-terminal)
[2]Solidification point, °C.
[3]Starting epoxidized olefin.

To provide a comparison, the following commercial natural fatty amines and fatty diamines were also employed:
  Distilled coconut alkyl amine
  Distilled tallow alkyl amine
  Distilled N-coconut-alkyl-aminopropylamine [i.e., N-coconut alkyl (trimethylenediamine)]
  Tallow alkyl aminopropylamine [i.e., N-tallow alkyl (trimethylenediamine)]

The following hygroscopic, caking salts and fertilizers were used for testing the anti-caking action of the above aminoalkanols:
  (a) Potassium chloride
  (b) "50% potassium" fertilizer;
    composition:
      KCl: 80.58%
      K$_2$SO$_4$: 3.00%
      NaCl: 13.17%
      MgSO$_4$: 2.25%
  (c) N-P-K Fertilizer
    active substances:
      N: 14%
      P$_2$O$_5$: 12%
      K$_2$O: 17%
    composition:
      K$_2$SO$_4$: 32.6%
      NH$_4$H$_2$PO$_4$: 25.0%
      Urea: 9.4%
      (NH$_4$)$_2$SO$_4$: 33.0%
  (d) Calcium ammonium nitrate
    active substances:
      N: 23%
      Ca: 15%
    composition:
      NH$_4$NO$_3$: 65%
      CaCO$_3$: 35%

Testing Method

The salts and fertilizers are dried and screened, and a weighed amount of the 0.8 mm.–1.0 mm. fraction is mixed in a Loedige mixer for five minutes. Then 0.1% of the aminoalkanol to be tested, based on the weight of the salts, is added to the fertilizer and the mixing is continued for five minutes. When the aminoalkanol to be tested is a solid at room temperature, the salt and the aminoalkanol are separately heated for 30 minutes at 70° C. before they are mixed.

Depending on the product to be tested, a small amount (100 g. or 125 g.) of the mixture is placed in a glass test tube (44 mm. in diameter and 100 mm. long, with roughened inner surface), at the bottom of which is placed an anchor disc (15 mm. in diameter). The substance to be tested is compressed for 30 minutes under a polyvinyl chloride plunger weighing 10 kg.

The force required to pull out the anchor disc is measured and is a measure of the anti-caking action of the aminoalkanols. The table contains in each case the mean value of six measurements. The smaller the force required to pull out the anchor disc, the smaller is the tendency of the salt or fertilizer to cake. In the table, the designation T indicates that the vicinal substituents are terminally located, and the designation N-T indicates that the vicinal substituents are located non-terminally.

EXAMPLE 1

The effectiveness of short-chained products with substantially terminal vicinal hydroxy and amino groups as anti-caking agents for potassium chloride, 50% potassium fertilizer ("50%K" fertilizer) and N-K-P fertilizer is shown in Table 2. The force required to remove the anchor disc is shown in grams. Practically all the aminoalkanols tested were more effective than coconut alkyl amine or coconut alkyl aminopropyl amine.

TABLE 2

| Anti-caking Agent | Grams to Remove Anchor Disc from | | |
|---|---|---|---|
| | KCl | 50%K Fertilizer | N-P-K Fertilizer |
| Untreated | 1398 | 283 | 575 |
| T24 M | 306 | — | 449 |
| T24 DM | 233 | — | — |
| T46 DM | 326 | — | — |
| T24 E | 164 | — | 465 |
| T24 AE | 303 | 174 | 180 |
| T46 AE | 303 | 174 | 180 |
| T24 AP | 222 | 265 | 184 |
| T46 AP | 244 | 197 | 229 |
| T24 DHE | 150 | 186 | 448 |
| T46 DHE | 153 | 211 | — |
| Coconut alkyl amine | 524 | 200 | 506 |
| Coconut alkyl aminopropylamine | 389 | 224 | 678 |

EXAMPLE 2

This example shows the effectiveness of the short-chain products with substantially non-terminal vicinal hydroxy- and amino groups against the caking of N-P-K fertilizer. The aminoalkanol mixtures according to the invention yield better results than "natural" amines, as can be seen from Table 3.

TABLE 3

| Anti-caking Agent | Grams to Remove Anchor Disc from N-P-K Fertilizer |
|---|---|
| Untreated | 575 |
| N-T14 A | 439 |
| N-T14 DHE | 322 |
| N-T14 HE | 331 |
| N-T14 HE-AE | 285 |
| Coconut alkyl amine | 506 |
| Coconut alkyl aminopropylamine | 678 |

EXAMPLE 3

The anti-caking action of the longer-chain products with substantially terminal vicinal hydroxy- and amino groups on potassium chloride, 50% potassium fertilizer, and N-P-K fertilizer is shown in Table 4.

TABLE 4

| Anti-caking Agent | Grams to Remove Anchor Disc from | | |
|---|---|---|---|
| | KCl | 50%K Fertilizer | N-P-K Fertilizer |
| Untreated | 1398 | 283 | 575 |
| T68 AE | 265 | 232 | 249 |
| T68 AP | 214 | 211 | 211 |
| T68 DHE | 150 | 213 | 329 |
| Tallow alkyl amine | 478 | 233 | 332 |
| Tallow alkyl aminopropylamine | 291 | 239 | 325 |

EXAMPLE 4

In this example we tested the anti-caking effect of the longer-chain aminoalkanol mixtures with substantially terminal hydroxy- and amino groups on the caking of 50% potassium fertilizer and calcium ammonium nitrate, compared to the anti-caking effect of amines based on natural fats. Here too, the products according to the invention show better results than the natural products, as can be seen from Table 5.

TABLE 5

| Anti-Caking Agent | Grams to Remove Anchor Disc from | |
|---|---|---|
| | 50%K Fertilizer | Calcium Ammonium Nitrate |
| Untreated | 283 | 1495 |
| N-T58 A | 204 | 1079 |
| N-T58 AE | 217 | 1074 |
| N-T58 AP | 252 | 1177 |
| N-T58 DHE | 201 | 1186 |
| N-T58 HE | 218 | 1182 |
| N-T58 HE-AE | 209 | 1214 |
| Tallow alkyl amine | 233 | 1246 |
| Tallow alkyl aminopropylamine | 239 | 1219 |

EXAMPLE 5

Other aminoalkanol products according to the invention from Table 1 with substantially non-terminal hydroxy- and amino groups were tested for their effectiveness. It can be seen from the results compiled in Table 6 that the tested products according to the invention, showed a better anti-caking effect than the comparison products.

TABLE 6

| Anti-caking Agent | Grams to Remove Anchor Disc from | |
|---|---|---|
| | KCl | N-P-K Fertilizer |
| Untreated | 1398 | 575 |
| N-T58 M | 337 | 277 |
| N-T14 DM | 321 | 437 |
| N-T58 DM | 309 | — |
| Coconut alkyl amine | 524 | 506 |
| Coconut alkyl aminopropyl amine | 389 | 678 |

EXAMPLE 6

The anti-caking effect of certain of the above-described aminoalkanols in the form of their acetate and chloride salts was also determined. The aminoalkanol salts were applied as aqueous solutions having a content in the range 30% to 70% by weight thereof. The solutions were applied at such rate as to deposit 0.1% of the aminoalkanol based on the weight of the material treated. Table 7 shows that these aminoalkanols provide a better anti-caking effect than the corresponding salts of the natural comparison substances.

TABLE 7

Anti-caking Agent Salt

| Name | % in Treating Solution | Grams to Remove Disc from KCl |
|---|---|---|
| Untreated | | 1398 |
| N-T58 A (Acetate) | 60 | 284 |
| N-T58 AE (Diacetate) | 60 | 251 |
| N-T58 AP (Diacetate) | —* | 356 |
| Tallow alkyl amine (acetate) | —* | 428 |
| N-T14 A (Chloride) | 60 | 148 |
| N-T14 AE (Dichloride) | 30 | 428 |
| N-T14 AP (Dichloride) | 40 | 429 |
| Coconut alkyl amine chloride | 35 | 498 |
| N-T58 A (Chloride) | 40 | 174 |
| N-T58 AE (Dichloride) | 40 | 446 |
| N-T58 AP (Dichloride) | 35 | 469 |
| Tallow alkyl amine chloride | 35 | 475 |

*Substance was not applied in solution but by hot melt method.

EXAMPLE 7

The dermatological tolerance of the aminoalkanol mixtures was tested by dropping small amounts of 2.5% solutions of the test substances in olive oil into the conjunctival sac of one eye of groups of albino rabbits. The reactions of the mucous membranes of the eye were evaluated according to a point system by Draize [Appraisal of the Safety of Chemicals in Foods, Drugs and Cosmetics, Assn. of Food and Drug Officials of the U.S., pp. 49–52 (1959)], for two hours, 1, 2, 4, 6 and 8 days after the application.

The results of the test are compiled in Table 8.

TABLE 8

Anti-caking Aminoalkanol

| Desig. | Conc. % By Wt. | Compatibility with Mucous Membrane |
|---|---|---|
| N-T14 A | 2.5% | Moderate conjunctival reaction practically disappeared after 24 hours; normal after 2 days. |
| N-T58 A | 2.5% | " |
| N-T14 AE | 2.5% | Moderate conjunctival reaction; normal after 4 days. |
| N-T58 AE | 2.5% | " |
| N-T14 AP | 2.5% | Strong conjunctival reaction; normal after 6 days. |
| N-T58 AP | 2.5% | Moderate conjunctival reaction practically disappeared after 4 days. |
| N-T14 DHE | 2.5% | Slight conjunctival reaction; normal after 1 day. |
| Dodecylamine | 2.5% | Moderate conjunctival reaction; normal after 4 days. |
| Dodecylaminopropylamine | 1.0% | Strong conjunctival reaction. After 8 days still 30%–40% of the maximum reaction. |

We claim:

1. A composition in particulate, free-flowing form consisting essentially of a hygroscopic salt component which normally cakes on storage having a uniformly distributed, effective surface content as anti-caking agent of from 0.05% to 0.2% by weight of said hygroscopic salt component of an aminoalkanol material selected from the group consisting of (1) a mixture of fatty vicinal aminoalkanols of the formula:

$$R_1-CH-CH-R_2 \quad \quad \diagup R_3$$
$$\quad | \quad \quad | \quad \quad \quad \quad$$
$$\quad OH \quad [NH-(CH_2)_x]_y-N$$
$$\quad \quad \quad \quad \quad \quad \quad \diagdown R_4$$

wherein $R_1$ and $R_2$ each represent a substituent selected from the group consisting of H and unbranched alkyl having from 1 to 18 carbon atoms, and the sum of the carbon atoms in $R_1$ and $R_2$ is from 9 to 18; $R_3$ and $R_4$ each represent a substituent selected from the group consisting of H, $C_{1-4}$ alkyl and $C_{2-4}$ hydroxyalkyl; and x represents a value from 2 to 6 and y represents a value from 0 to 1, inclusive, the $$R_1-CH-CH-R_2$$
$$\quad | \quad \quad | \quad$$

units in the aminoalkanols of said mixture being of at least two different chain lengths in the range from 11 to 20 carbon atoms; and (2) salts of said aminoalkanols.

2. A composition according to claim 1 wherein $R_1$ and $R_2$ each represent a $C_1$–$C_{18}$ straight chain alkyl substituent.

3. A composition according to claim 1 wherein $R_2$ represents H.

4. A composition according to claim 1 wherein $R_3$ and $R_4$ each represent $C_{1-4}$ alkyl.

5. A composition according to claim 1 wherein said hygroscopic salt component is a mixture of fertilizer salts.

6. A composition according to claim 1 wherein the $$R_1-CH-CH-R_2$$
$$\quad | \quad \quad | \quad$$

units are of $C_{16}$–$C_{18}$ chain length.

7. A composition according to claim 1 wherein said hygroscopic salt component is a water-soluble, inorganic salt fertilizer.

8. A composition according to claim 1 wherein said hygroscopic salt component is calcium ammonium nitrate.

9. A composition according to claim 1 wherein said aminoalkanol material is present as a salt with a water-soluble carboxylic acid.

10. A composition according to claim 1 wherein substantially all of said aminoalkanol material is on the surface of said particles.

11. A composition according to claim 1 wherein the $$-CH-CH- \quad \quad \quad \diagup R_3$$
$$\quad | \quad \quad | \quad \quad \quad \quad$$
$$\quad OH \quad [NH-(CH_2)_x]_y-N$$
$$\quad \quad \quad \quad \quad \quad \quad \diagdown R_4$$

units are located substantially terminally on the $$R_1-CH-CH-R_2$$
$$\quad | \quad \quad | \quad$$

chain.

12. A composition according to claim 1 wherein y is O and $R_3$ and $R_4$ represent H.

13. A composition according to claim 1 wherein y is O, $R_3$ is H and $R_4$ is $-CH_3$.

14. A composition according to claim 1 wherein y is O, $R_3$ and $R_4$ are $-CH_2CH_2OH$.

15. A composition according to claim 1 wherein y is 1, x is 2 and $R_3$ and $R_4$ are H.

16. A composition according to claim 1 wherein x is 2, y is 1, $R_3$ is H and $R_4$ is $-CH_2CH_2OH$.

* * * * *